Jan. 23, 1962  N. P. MANTERIS  3,017,819
PORTABLE BARBECUE MACHINE
Filed Dec. 3, 1959  2 Sheets-Sheet 1
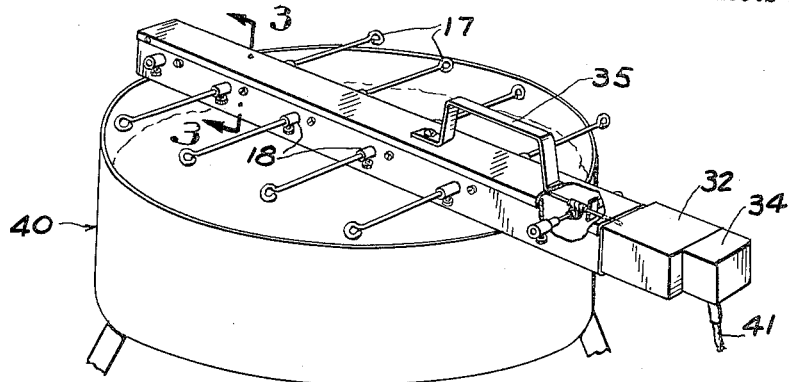
FIG. 1
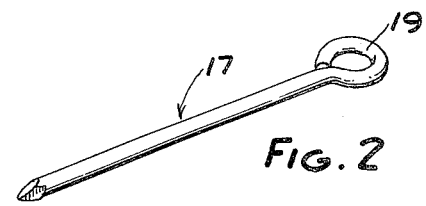
FIG. 2
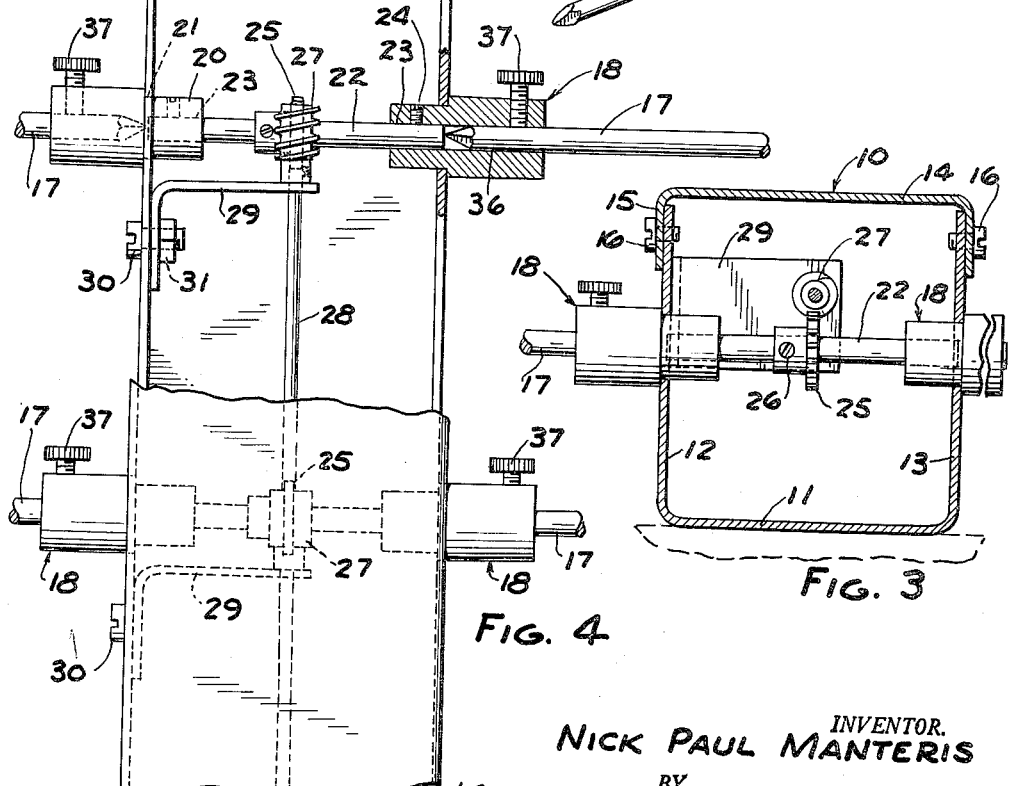
FIG. 4
FIG. 3
INVENTOR.
NICK PAUL MANTERIS
BY
Barnes, Kisselle, Raisch
& Choate
ATTORNEYS Jan. 23, 1962    N. P. MANTERIS    3,017,819
PORTABLE BARBECUE MACHINE
Filed Dec. 3, 1959    2 Sheets-Sheet 2

INVENTOR.
NICK PAUL MANTERIS
BY
Barney, Kinille, Reisch & Choate
ATTORNEYS

10# United States Patent Office 3,017,819
Patented Jan. 23, 1962

3,017,819
PORTABLE BARBECUE MACHINE
Nick Paul Manteris, 10310 Saratoga, Oak Park, Mich.
Filed Dec. 3, 1959, Ser. No. 857,028
9 Claims. (Cl. 99—421)

This invention relates to portable barbecue machines and particularly such machines as are used by individuals for barbecuing skish kibab in or about the home.

Barbecue machines which are currently available for use by individuals in or about the home usually comprise a motor which is mounted at the side of the barbecue grill and is operatively connected to one or more skewers which are journalled at each end on supports. Such machines have certain obvious disadvantages. First, when the barbecuing is completed, it is a rather difficult job to remove the skewer from the machine without burning one's hands. In addition, where shish kibab is made, the meat must then be segregated from the skewer in order to be divided among several individuals.

It is an object of this invention to provide a portable barbecue machine wherein the entire machine may be removed from its position adjacent a fire to a cooler area so that the skewers can be easily removed.

It is a further object of the invention to provide such a machine which incorporates a plurality of removable skewers so that one or more individual skewers may be provided for each person.

It is a further object of the invention to provide such a portable barbecue machine which includes a relatively simple drive mechanism which requires no lubrication.

Basically, the barbecue machine comprises an elongated housing having drive means at one end thereof. The housing is adapted to rest directly over the fire, for example, by placing it on the barbecue grill. A plurality of skewer holders are rotatably mounted in the housing and include sockets extending laterally of the axis of the housing. A skewer made of wire has one end thereof positioned in a socket and the other end thereof extending laterally, free and unsupported. Each skewer is held in position on its respective socket holder by a manually operated set screw. A driving connection is provided between the motor on the housing and each socket holder and includes a shaft rotatably mounted in the housing with its axis parallel to the axis of the housing. In use, the housing is placed on the barbecue grill over the fire and the motor is energized to rotate the skewer holders. Since a plurality of skewer holders are provided, it is possible to utilize as many skewer holders as is necessary to accommodate the number of persons who are to be served, one or more skewers being provided for each person. When the barbecuing is completed, a handle on the housing serves as a means for removing the housing to a cooler area wherein each skewer may be readily removed from the barbecue machine by loosening the set screws.

In the drawings:

FIG. 1 is a perspective view of the barbecue machine made in accordance with my invention showing the machine in operative position on a portable barbecue grill.

FIG. 2 is a perspective view of one of the skewers used in the barbecue machine.

FIG. 3 is a fragmentary sectional view on an enlarged scale taken along the line 3—3 in FIG. 1.

FIG. 4 is a fragmentary plan view of the barbecue machine, parts being broken away, and parts being shown in section.

Figure 5:
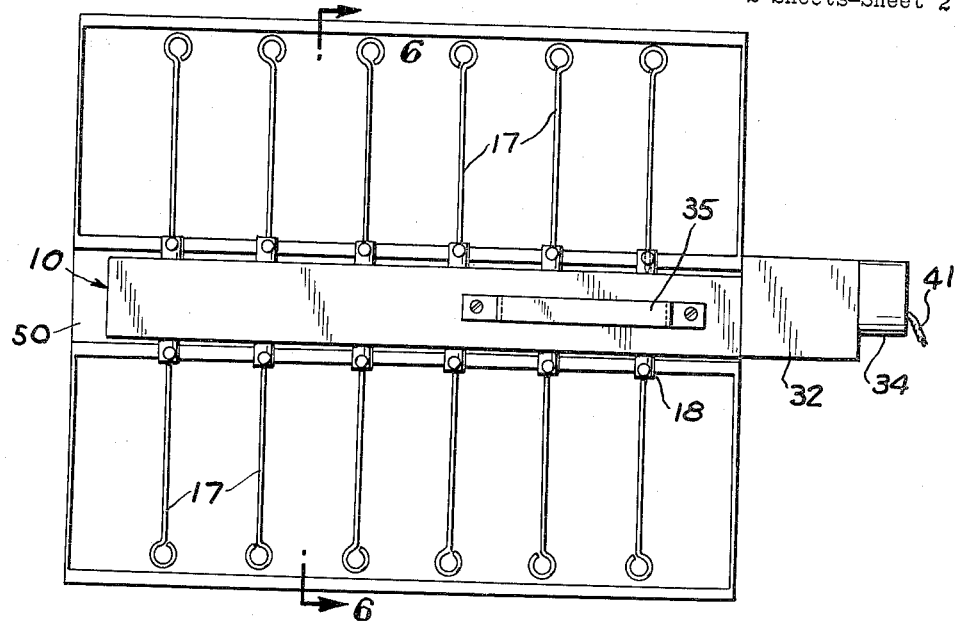
FIG. 5 is a plan view of the barbecue machine in position on a specially built barbecue grill.

Referring to FIG. 1, the barbecue machine made in accordance with the invention comprises a tubular housing 10 which is rectangular in cross section and has the ends thereof open. Specifically, housing 10 is made of sheet metal and comprises a bottom wall 11, side walls 12, 13 and a removable top wall 14 which has flanges 15 engaging the outer surfaces of the side walls 12, 13. Top wall 14 is held in position by screws 16 extending through flanges 15 into side walls 12, 13. A plurality of skewers 17 are removably mounted in skewer holders 18 at longitudinally spaced points along the housing 10. As shown in FIG. 2, each skewer holder is preferably made of wire having a circular cross section and formed in one end with a loop 19. As will be readily apparent from further description of the invention, the skewer 17 may be made of other materials or other cross sections.

Referring to FIGS. 3 and 4, each skewer holder 18 preferably comprises a reduced portion 20 which extends through an opening 21 in its respective side wall 12 or 13. The skewer holders 18 on wall 12 are preferably positioned directly opposite the skewer holders on wall 13 and opposed skewer holders are connected by a shaft 22 extending into openings 23 in the reduced portions 20 and rotatably fixed by the set screws 24.

The skewer holders 17 are adapted to simultaneously rotate by a drive means which includes a worm gear 25 fixed on each shaft 22 by a set screw 26. Each worm gear 25 is operatively connected to a worm 27 fixed on a shaft 28 extending longitudinally of housing 10. The shaft 28 is supported on housing 10 by L-shaped brackets 29 which are held in position by bolts 30 extending through the side walls and the bracket 29. Nuts 31 are threaded on bolts 30. Shaft 28 supports a plurality of worms 27 which are engaged with the worm gears 25 on the cross shafts 22. The shaft 28 is connected at one end to a reduction gear box 32 which in turn is driven by a motor 34 mounted on the end of housing 10. Motor 34 is herein shown as electric but a spring wound motor can be used where electricity is not available. A handle 35 is fixed to the top wall 14 of housing 10 and is positioned at a point along the length thereof such that when the barbecue machine is lifted by grasping the handle 35 the machine is substantially balanced.

In order to use the machine to make shish kibab, each skewer 17 is provided with a desired quantity of meat and inserted in a socket 36 of its respective skewer holder 18 and a thumb screw 37 is tightened to hold the skewer in position. It can be appreciated that since the skewers are relatively short in length individual skewers may be provided for each person to be served. After the skewers are placed in position, the barbecue machine is transferred to its position adjacent the fire which may be provided, in the usual case around the home, by a portable barbecue grill 40 of the usual variety comprising a container in which charcoal or the like is ignited to form the fire. The barbecue machine can be supported over the fire by the edges of the container or if a grill is provided, the machine may be placed directly on the barbecue grill. The electrical cord 41 to motor 34 is then plugged into a suitable source of current and the motor 34 operates to rotate the shaft 28 through the reduction gear box 32 and, in turn, rotate each cross shaft 22 and the skewer holders 18 and skewers 17. In this manner, the meat is caused to rotate over the fire at a slow uniform rate. Because of the relatively low speed at which the skewers are rotated and the lack of precision fit between the parts, which can be on the order of five revolutions per minute, no lubrication is required for the moving parts and no adverse effects are encountered because of heat.

After the meat has been barbecued to the desired degree, the barbecue machine is lifted from the fire by using the handle 35 and is moved to a cooler area where each skewer 17 can be removed by loosening thumb screw 37. The loop 19 on the free end of each skewer 17 serves as a ready means for grasping the skewer.

Figure 6:
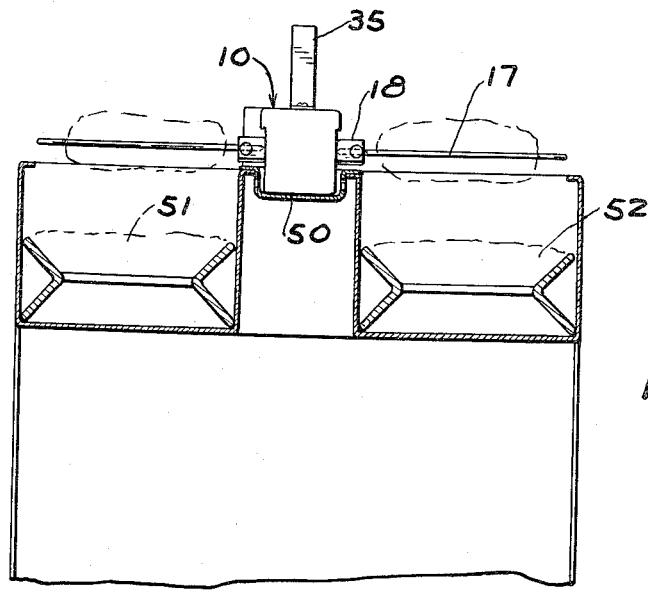
FIG. 6 is a fragmentary sectional view taken along the line 6—6 in FIG. 5.

Although the barbecue machine as described above may be used by placing it above any source of fire, it may be desirable to provide a barbecue grill of particular construction wherein a special support is provided for the machine. Such a grill is shown in FIGS. 5 and 6 wherein the grill is generally rectangular and is provided with an elevated support 50 on which the barbecue machine is placed. Support 50 is elevated with respect to fire boxes 51, 52 so that when the machine is in position on the support 50, the skewers 17 project into overlying relationship to the fire in the fire boxes 51, 52. As shown in FIG. 6, the support 50 can be made as an integral part of a sheet metal grill.

Figure 7:
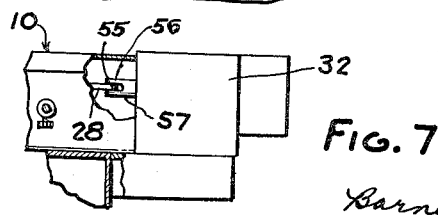
FIG. 7 is a fragmentary elevational view of a further modified form of barbecue machine.

As shown in FIG. 7, it may be found more convenient to make the gear box motor a permanent part of the barbecue grill and have a disconnectable connection of simple type between the shaft 28 and the gear box and the motor. Such a connection may comprise a cross pin 55 which engages the slotted end 56 on the output shaft 57 of the gear box. When it is desired to remove the barbecue machine, the handle 35 is grasped elevating the housing to release the pin 55 from the slotted end 56 of shaft 57.

It can thus be seen that I have provided a barbecue machine which is such that it may be removed from its position adjacent the fire to a cooler area permitting the skewers to be readily handled. The machine comprises and utilizes a plurality of small skewers thus providing individual servings. The construction is such that the machine may be made at low cost and requires little maintenance or lubrication.

I claim:

1. In a portable barbecue grill, the combination comprising a portable hollow tubular housing having a substantially greater length than width, a plurality of skewer holders mounted in the opposite sides of said housing, a skewer individual to each said skewer holder removably mounted in each said skewer holder with its axis extending generally laterally of the longitudinal axis of the housing, and drive means at least partially within said housing and drive means at least partially within said housing operatively connected to said skewer holders for rotating said skewer holders.

2. The combination set forth in claim 1 including means defining an opening intermediate the ends of the post into which the hand can be inserted thereby forming a handle on the exterior of said housing intermediate its ends for placing and removing said housing in position over a barbecue fire.

3. The combination set forth in claim 1 wherein each said skewer holder includes a socket having its axis extending laterally of the housing, each said skewer being made of wire and having one end thereof engaging said socket and the other end thereof free and unsupported, and manually operated set screw means for holding each said skewer in its respective socket.

4. The combination set forth in claim 1 wherein said drive means includes a motor mounted at one end of said housing.

5. The combination set forth in claim 4 wherein said drive means includes a shaft rotatably mounted in said housing with its axis generally parallel to the longitudinal axis of said housing.

6. The combination set forth in claim 1 wherein said drive means includes a motor, and means forming a readily disconnectable drive connection between said motor and said skewer holders.

7. In a portable barbecue grill, the combination comprising a portable hollow tubular housing having a substantially greater length than width, a plurality of skewer holders mounted in the opposite sides of said housing, a skewer individual to each said skewer holder removably mounted in each said skewer holder with its axis extending generally laterally of the longitudinal axis of the housing, each said skewer being substantially straight, said skewers having their axes lying in substantially the same plane, and drive means at least partially within said housing operatively connected to said skewer holders for rotating said skewer holders.

8. The combination set forth in claim 7 including means on the top of said hollow tubular housing intermediate the ends thereof defining a hand receiving opening thereby forming a handle whereby said housing may be readily placed in position or removed from position overlying a source of heat.

9. The combination set forth in claim 7 wherein said drive means includes a motor having a shaft, and a shaft rotatably mounted within said housing, and means disconnectably connecting said shafts comprising a pin on one of said shafts and a slot in the other of said shafts into which said pin extends.

References Cited in the file of this patent

UNITED STATES PATENTS

| | | |
|---|---|---|
| 2,130,259 | Bonaguidi | Sept. 13, 1938 |
| 2,346,628 | Todd | Apr. 11, 1944 |
| 2,867,165 | Money | Jan. 6, 1959 |
| 2,929,311 | Heltzel | Mar. 22, 1960 |

FOREIGN PATENTS

| | | |
|---|---|---|
| 639,384 | Germany | Dec. 4, 1936 |